Figure 4:
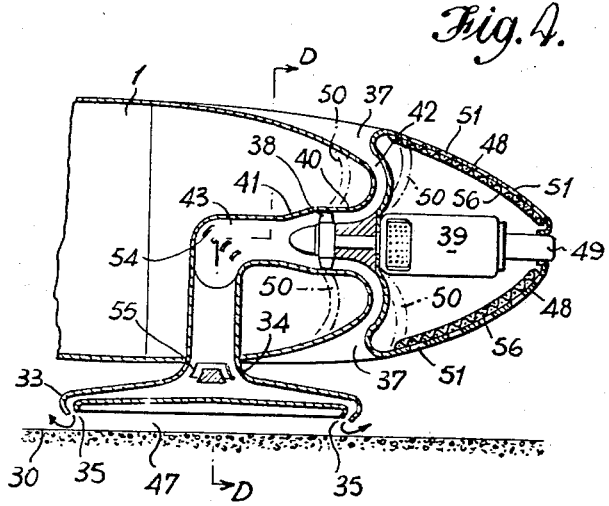

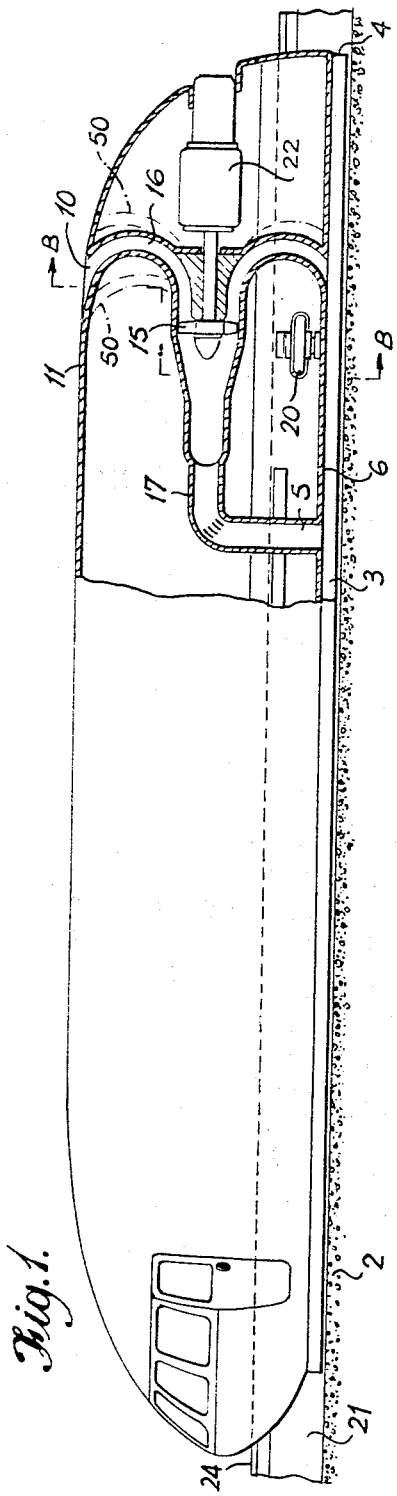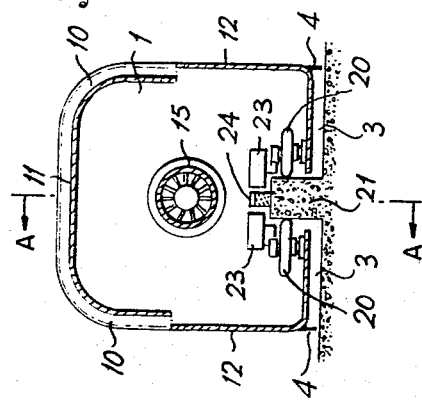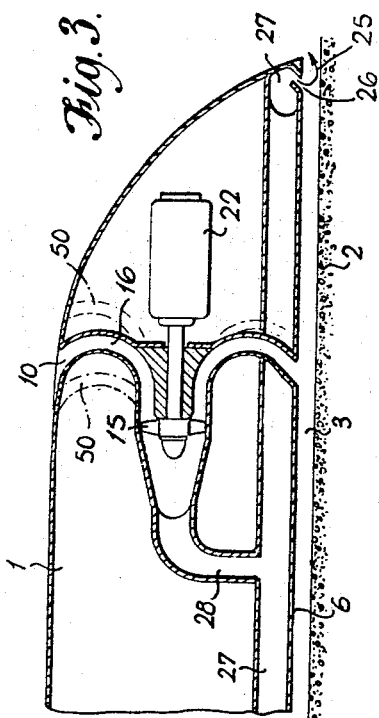

United States Patent Office 3,330,221
Patented July 11, 1967

3,330,221
GAS-CUSHION SUPPORTED VEHICLES WITH DRAG INHIBITING MEANS FOR TRAVELLING ON RAILS
Robert Longley Trillo, Dibden Purlieu, Southampton, England, assignor to Hovercraft Development Limited, London, England, a British company
Filed Dec. 14, 1964, Ser. No. 418,105
Claims priority, application Great Britain, Dec. 20, 1963, 50,494/63
15 Claims. (Cl. 104—120)

This invention relates to gas-cushion supported vehicles and can be applied to vehicles which are supported relative to a prepared track by cushions of pressurised gas formed and contained between the surface of the track and the main body of the vehicle.

One example of such a vehicle is in the form of railcar travelling in spaced relationship to a prepared track, as described and illustrated in the co-pending application of Christopher Sydney Cockerell, Ser. No. 128,742, filed Aug. 2, 1961, now Patent No. 3,174,440. In this example the vehicle is supported by one or more cushions of pressurised gas contained for at least part of its periphery by curtains of moving fluid. Another example of such a vehicle is in the form of a railcar again supported in spaced relationship to a prepared track by one or more cushions of pressurised gas but in which the cushions are contained at their peripheries by flexible wall structures or "skirts."

The cushion or cushions of pressurised gas may extend over substantially the whole area of the bottom surface of the main body. Where fluid curtains are formed to contain the cushion or cushions, these normally issue from the bottom surface of the vehicle, whilst where flexible wall structures are used to contain the cushion or cushions, these are attached to the bottom surface of the vehicle. These arrangements are, in general, more suitable for relatively low speed vehicles.

A gas-cushion vehicle may also be supported by relatively small cushions of high pressure gas, formed between the prepared surface and pads attached to the main body of the vehicle. The cushion or cushions may then be contained by curtains of moving fluid issuing from the pads, or by flexible wall structures attached to the pads. These arrangements are, in general, more suitable for relatively high speed vehicles.

When moving, the body of the vehicle will have a flow of air over a substantial part of its surface. A boundary layer will exist in contact with the surface of the vehicle and, as in airfoil and similar shapes, considerable drag will be caused by the boundary layer separating from the surface of the vehicle and creating the so-called separation drag.

The present invention is concerned with the control of the boundary layer to reduce the drag and increase the efficiency of the vehicle.

For other forms of vehicle, such as aircraft, the control of the boundary layer requires the taking in of large quantities of air, requiring large quantities of power to drive the pumps which draw in the air, with a corresponding weight penalty. The quantity of air taken in may be in excess of any requirements for the propulsion engines and in any case is usually available only at positions which are at least very inconvenient for ducting to the engines. Therefore, the air taken in is subsequently discharged into the surrounding atmosphere and represents a complete loss of the power required to draw in the air. Further, the power required to take in the air is of the same order as the reduction in propulsion power obtained by the control of the boundary layer and results in little or no overall gain in efficiency.

On the other hand, in gas-cushion supported vehicles, large quantities of gas are required for forming and maintaining the cushions of pressurised gas. Generally the cushions and, where provided, the curtains, are formed of air, and the invention provides control of the boundary layer by drawing in air from the boundary layer to form the cushions and/or curtains without the provision of further pumps.

According to the invention a gas-cushion vehicle, which in operation is supported relative to a surface by at least one cushion of pressurised gas formed and contained in a space between the surface and the vehicle body, has air intake means extending around at least the top and sides of the vehicle body in a direction substantially normal to ambient air flow over the vehicle body, a rotary air-energising device mounted within the vehicle body, said device having an air inlet and an air outlet, first duct means connecting the intake means with said air inlet, and second duct means connecting said air outlet with the cushion space whereby boundary layer air drawn into said intake means provides at least part of the gas-cushion supporting the vehicle.

Where the cushion is contained by a flexible wall structure or "skirt," the air is preferably fed directly to the cushion through the supply port, the air escaping beneath the bottom of the wall structure. Where the cushion is contained by one or more curtains of moving air, the second duct means preferably include a supply port disposed at the periphery of the cushion space, the air issuing from the supply port to form an air curtain which forms, maintains and contains the cushion. A combination of flexible wall structure or "skirt" and air curtain can be used. Further, although air is normally used, the cushion, and the curtain, can be of a mixture of air and other gases, for example exhaust gases.

Figure 5:
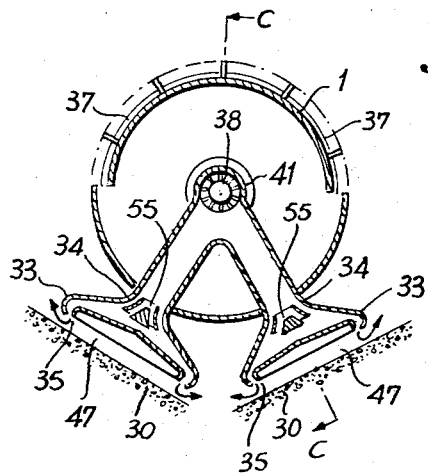

The invention will be readily understood by the following description of certain embodiments, by way of example, in conjunction with the accompanying drawings in which:

FIGURE 1 is a side view of a vehicle embodying the invention, the rear part of the vehicle being shown in diagrammatic cross-section on the line A—A of FIGURE 2, FIGURE 2 is a cross-section on the line B—B of FIGURE 1, FIGURE 3 is a cross-section similar to that of FIGURE 1, illustrating a modification thereof, FIGURE 4 is a diagrammatic cross-section through the rear of a further form of vehicle, on the line C—C of FIGURE 5, and FIGURE 5 is a cross-section on the line D—D of FIGURE 4.

FIGURES 1 and 2 illustrate a form of vehicle 1 which is supported relative to a track 2 by a cushion of pressurised air formed in the space 3 beneath the vehicle. The space 3 is bounded at its periphery by a flexible wall structure or "skirt" 4. Supply ports 5 open into the space 3 through the bottom surface 6 of the vehicle at points remote from the periphery of the cushion space 3.

An intake 10 extends (in a direction substantially normal to ambient air flow over the vehicle body) round the major part of the circumference of the body of the vehicle, actually extending across the top 11 and down both sides 12. As a cushion of air is formed in contact with the bottom 6, when the vehicle is operating, it will be seen that the intake 10 extends for substantially the whole of that part of the circumference of the body of the vehicle against which a boundary layer will be formed.

The intake 10 is connected to the inlet of a horizontally disposed axial flow fan or pump 15 via a duct 16. The outlet of the fan 15 is connected to the supply ports 5 via a duct 17. The rotational axis of the fan 15 is disposed parallel to the fore and aft axis of the vehicle body. This arrangement ensures that the paths taken by air inflowing to the fan 15 are substantially of the same length. The fan 15 is driven "direct" by an engine 22. This arrangement reduces drive complexities.

In operation, at starting, the fan or pump 15 draws in air through the intake 10 and supplies it to the space 3 to form the pressurised cushion. Once the cushion has been formed the vehicle can be propelled, by any suitable means, for example, by means of a linear motor 23 in the manner described in the co-pending applications of Denys Stanley Bliss, Ser. No. 280,617, filed May 15, 1963, now abandoned, and Ser. No. 582,067, filed Sept. 26, 1966, and the intake 10 then draws in air from the boundary layer. Thus the one energising means, i.e. the fan 15, both controls the boundary layer and supplies air for maintaining the pressurised cushion.

The vehicle is guided along a path determined by the track 2, by so-called caliper-wheels 20 running in contact with the sides of a centrally raised "rail" portion 21 of the track 2. Other forms of guiding can be used, for example cushions of pressurised air can be formed on either side of the rail 21, between the rail and co-operating surfaces on the vehicle body. If desired, the caliper wheels can be used for propelling the vehicle. The rail 21 carries a conductor bar 24 which co-operates with the linear motor 23.

FIGURE 3 illustrates a modification of the vehicle illustrated in FIGURES 1 and 2, in which the cushion of pressurised gas is contained at its periphery by a curtain of air 25 formed from a supply port 26 formed in the bottom surface 6 adjacent to the periphery thereof. Air is supplied to the supply port 26 through supply ducts 27, and the outlet of the fan 15 is connected to the supply duct 27 by ducts 28. It will also be seen that the rear end of the body has a shape less bluff than that of the body of FIGURE 1. Such a shape can also be used for the vehicle in FIGURE 1.

In the embodiments illustrated in the FIGURES 1, 2 and 3, more than one fan 15 can be provided, for example, in a horizontal or vertical configuration, either situated side by side or in a semi-circle or three sides of a square. The space 3 can be subdivided either by flexible wall structures, curtains of moving air or combinations of these.

Again, the intake 10 can be subdivided by webs or the like, or can be formed of separate, short, slot-like openings. In the latter case, two or more rows of such openings can be provided, the openings being staggered.

FIGURES 4 and 5 illustrate an alternative form of vehicle 1, which is supported relative to a prepared track 30 by cushions of pressurised air formed between discrete support members 33 and the track 30. The support members 33 are in the form of pads spaced from the body of the vehicle and attached thereto by short struts 34. Formed in the bottom of each pad, adjacent to the periphery thereof, is a supply port 35. In an alternative arrangement, not shown, the members 33 need not be spaced from the body of the vehicle but can be on the surface of, and faired into, the body.

Extending circumferentially around the whole of the body of the vehicle, which is of circular cross-section, is an annular-section intake 37. Within the vehicle is housed a centrally-disposed axial flow fan or compressor 38 driven by a similarly disposed internal-combustion engine 39 (gas-turbine). The rotational axes of the compressor and its drive are coincident, are parallel to the fore and aft axis of the vehicle and may be further coincidental therewith. The compressor 38 has an annular inlet 40 and an annular outlet 41. A duct 42 connects the annular intake 37 to the inlet 40 and a further duct 43 connects the outlet 41 to the members 33. As shown there are two members 33 at the rear of the vehicle and the duct 43 is bifurcated and feeds both members.

In operation, the air forming the boundary layer is drawn into the annular intake 37 and flows through the duct 42 to the annular inlet 40 of the compressor 38. From the compressor 38 the air flows through the duct 43 over flow-guide members 54, 55, to the interior of the members 33. The air issues from the supply ports 35 to form curtains of air which form and maintain cushions of pressurised air 47 between the members 33 and the track 30.

Thus the compressor 38 controls the boundary layer by drawing in air from this layer, reducing the drag of the vehicle and at the same time provides the air for forming the air curtains.

Controlling the boundary layer also permits the use of a bulbous or short stubby shape for the body of the vehicle. (For high speeds it is normally necessary to use long slim body shapes which restrict the capacity of the vehicle.) In the present instance, by being able to use a fatter shape for the body a more convenient and useful shape can be provided without producing a corresponding increase in drag. Further, it may be possible to reduce the standard of the surface finish of the vehicle body.

The intake 37 is illustrated and described as being annular and extending completely round the vehicle body. Generally, for manufacturing reasons, webs or the like are likely to extend across the intake. The intake 37 may comprise a series of separate arcuate openings spaced round the circumference of the vehicle body in an annular configuration. In such a case, two or more intakes may be provided, each comprising a series of arcuate openings, the openings being staggered so as to overlap each other.

In all the examples illustrated and described, a series of longitudinally spaced intakes may be used, for example as indicated by the dotted lines 50 in FIGURES 1, 3 and 4.

More than one fan or compressor may be provided, situated side-by-side. Each compressor can feed a single member 33, or the output from the compressors can be combined before being fed to the members. The compressors can also have variable pitch blades to control the mass flow of air drawn in through the intakes. The members 33 can be articulated, or otherwise flexibly attached, to the vehicle body.

FIGURE 4 also illustrates a further means for reducing the drag on the vehicle. Residual eddies are likely to occur behind the body of the vehicle, causing drag. By causing the engine 39 to draw in its combustion air through a series of inlets 51 perforating the rear surface 48 of the vehicle, the flow of ambient air over this surface is smoother. The exhaust of the engine is discharged through an exhaust outlet 49, preferably directed rearward, as illustrated, whereby the core of the air wake rearward of the vehicle body is filled, to further reduce drag. Air flow through the inlets 51 is filtered by knitmesh filters 56.

The invention provides for a "direct" supply of air for cushion requirements and does not require a plenum chamber arrangement. A vehicle according to the invention can thus be made of low height to further reduce drag.

I claim:
1. A gas-cushion supported vehicle which, in operation, is supported relative to a surface by at least one cushion of pressurised gas formed and contained in a space between the surface and the vehicle comprising a vehicle body, boundary layer air intake means extending around at least the top and sides of the vehicle body in a direction substantially normal to ambient air flow over the vehicle body, an axial flow fan mounted within the vehicle body with its rotational axis substantially parallel to the fore and aft axis of the vehicle, said fan having an air in- let and an air outlet, first duct means connecting the intake means with said air inlet, and second duct means connecting said air outlet with the cushion space, whereby boundary layer air drawn into said intake means provides at least part of the gas cushion supporting the vehicle.

2. A vehicle as claimed in claim 1 wherein the second duct means include an air supply port disposed at the periphery of the cushion space so that air outflowing through the supply port forms an air curtain at least partly containing the cushion at said periphery.

3. A vehicle as claimed in claim 1 wherein the second duct means include an air supply port disposed remote from the periphery of the cushion space.

4. A vehicle as claimed in claim 3 including a flexible wall structure bounding at least part of the cushion space.

5. A vehicle as claimed in claim 1 wherein the vehicle body has a vertical cross-section, normal to its fore and aft axis, of substantially circular form and said air intake means extend around substantially the whole of the circumference of said body.

6. A vehicle as claimed in claim 5 wherein the first duct means and the air inlet of the air-energising means have a cross-section, normal to their length, of annular form.

7. A vehicle as claimed in claim 1 including a plurality of pad members carried by the vehicle body for forming therebeneath a plurality of discrete pressurised gas cushions and wherein the second duct means connects at least one of said discrete cushions with the air outlet of said fan.

8. A vehicle as claimed in claim 1 including an internal combustion engine for driving the fan.

9. A vehicle as claimed in claim 8 including combustion air intake means leading to the engine from a region externally adjacent the rear end of the vehicle body so as to reduce the formation of drag-inducing air eddies.

10. A vehicle as claimed in claim 9 wherein the combustion air intake means include a plurality of apertures perforating the rear end of the vehicle body, said internal combustion engine being housed within said rear end so as to draw ambient air through said apertures.

11. A vehicle as claimed in claim 8 including means for discharging exhaust gases from said internal combustion engine rearwardly of the vehicle body in a rearward direction whereby the core of the airwake rearward of the vehicle body is filled to further reduce drag.

12. A vehicle according to claim 1 including an internal combustion engine for driving the fan, the drive axis of said engine being coincident with the fan axis.

13. The combination of a vehicle according to claim 1 and a prepared track providing a surface over which the vehicle can travel along a path determined by said track.

14. The combination of claim 13 wherein said track includes a rail member and the vehicle including a pair of guide wheels for contact with the sides of the rail member.

15. The combination of claim 13 including means for propelling said vehicle along said rail member comprising a linear traction motor carried by the vehicle and cooperating conductor means carried by said rail member.

References Cited

UNITED STATES PATENTS

| | | | |
|---|---|---|---|
| 3,096,728 | 7/1963 | Amman et al. | 180—7 X |
| 3,117,645 | 1/1964 | Cockerell | 180—7 |
| 3,118,513 | 1/1964 | Cockerell | 180—7 |
| 3,164,103 | 1/1965 | Lathers et al. | 180—7 X |
| 3,172,495 | 3/1965 | Bliss et al. | 180—7 |
| 3,190,235 | 6/1965 | Bertin et al. | 180—7 X |
| 3,193,215 | 7/1965 | Dunham | 180—7 X |
| 3,207,113 | 9/1965 | Tattersall | 180—7 X |

A. HARRY LEVY, *Primary Examiner.*